United States Patent
Takano et al.

(10) Patent No.: US 9,594,407 B2
(45) Date of Patent: Mar. 14, 2017

(54) ELECTRONIC DEVICE AND COORDINATE DETECTION METHOD

(71) Applicant: Panasonic Intellectual Property Corporation of America, Torrance, CA (US)

(72) Inventors: Tomoki Takano, Kanagawa (JP); Takeshi Yamaguchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 176 days.

(21) Appl. No.: 14/196,980

(22) Filed: Mar. 4, 2014

(65) Prior Publication Data

US 2014/0320429 A1    Oct. 30, 2014

(30) Foreign Application Priority Data

Apr. 26, 2013  (JP) ................. 2013-093646

(51) Int. Cl.
| | |
|---|---|
| *G06F 3/041* | (2006.01) |
| *G06F 1/16* | (2006.01) |
| *G06F 3/044* | (2006.01) |

(52) U.S. Cl.
CPC ............ *G06F 1/1694* (2013.01); *G06F 3/044* (2013.01); *G06F 3/0416* (2013.01); *G06F 2203/04101* (2013.01)

(58) Field of Classification Search
CPC ........ G06F 3/041; G06F 3/044; G06F 3/0416; G06F 1/1694
USPC ................................. 345/173–174
See application file for complete search history.

(56) References Cited

U.S. PATENT DOCUMENTS

| | | | |
|---|---|---|---|
| 2009/0167508 A1* | 7/2009 | Fadell et al. | ............... 340/407.2 |
| 2011/0115738 A1* | 5/2011 | Suzuki et al. | ................ 345/173 |
| 2011/0115742 A1* | 5/2011 | Sobel | ...................... G06F 21/32 |
| | | | 345/174 |

(Continued)

FOREIGN PATENT DOCUMENTS

JP    2009-181232 A    8/2009

OTHER PUBLICATIONS

Tate, Daniel; Glove Touch Detection for Capacitive Touchscreen Devices; Mar. 11, 2013; U.S. Appl. No. 61/776,252.*

(Continued)

*Primary Examiner* — Kwin Xie
(74) *Attorney, Agent, or Firm* — Seed IP Law Group LLP

(57) ABSTRACT

An electronic device includes a housing, a planar display section, a planar transparent member, a touch panel layer which detects two-dimensional coordinates of an indicator having a predetermined conductivity along a surface of the display section and a vertical distance to the indicator, and an acceleration detection section which detects at least one of an acceleration of the housing and an acceleration of the transparent member. The two-dimensional coordinates are determined as effective coordinates when the vertical distance is equal to or smaller than a first value. The two-dimensional coordinates are determined as the effective coordinates when the vertical distance is more than the first value and is equal to or smaller than a second value more than the first value, and the acceleration detection section detects a predetermined acceleration.

20 Claims, 23 Drawing Sheets

| DETECTION STATE | TOUCH PANEL LAYER | DEPRESSION | ACCELERATION | IMPACT | DETERMINATION |
|---|---|---|---|---|---|
| A | TOUCH | × | × | – | FINGER (FEATHER TOUCH) |
| B | TOUCH | ○ | – | – | FINGER (PUSH) |
| C | TOUCH | – | ○ | – | FINGER (PUSH) |
| D | HOVER | × | × | × | HOVER |
| E | HOVER | ○ | – | – | GLOVE |
| F | HOVER | × | ○ | × | GLOVE |
| G | HOVER | × | – | ○ | NAIL |

○ : DETECTION
× : NON-DETECTION
– : UNCHECKED

(56) References Cited

U.S. PATENT DOCUMENTS

2013/0181928 A1* 7/2013 Li .................................. 345/173
2013/0328828 A1* 12/2013 Tate .............................. 345/174
2014/0022181 A1* 1/2014 Bergman ...................... 345/173

OTHER PUBLICATIONS

Tate, Daniel; Finger Identification and Gestures in a Touchscreen Device; Jun. 12, 2012; U.S. Appl. No. 61/658,524.*

* cited by examiner

FIG. 6

| DETECTION STATE | TOUCH PANEL LAYER | DEPRESSION | ACCELERATION | IMPACT | DETERMINATION |
|---|---|---|---|---|---|
| A | TOUCH | × | × | – | FINGER (FEATHER TOUCH) |
| B | TOUCH | ○ | – | – | FINGER (PUSH) |
| C | TOUCH | – | ○ | – | FINGER (PUSH) |
| D | HOVER | × | × | × | HOVER |
| E | HOVER | ○ | – | – | GLOVE |
| F | HOVER | × | ○ | × | GLOVE |
| G | HOVER | × | – | ○ | NAIL |

○ : DETECTION
× : NON-DETECTION
– : UNCHECKED

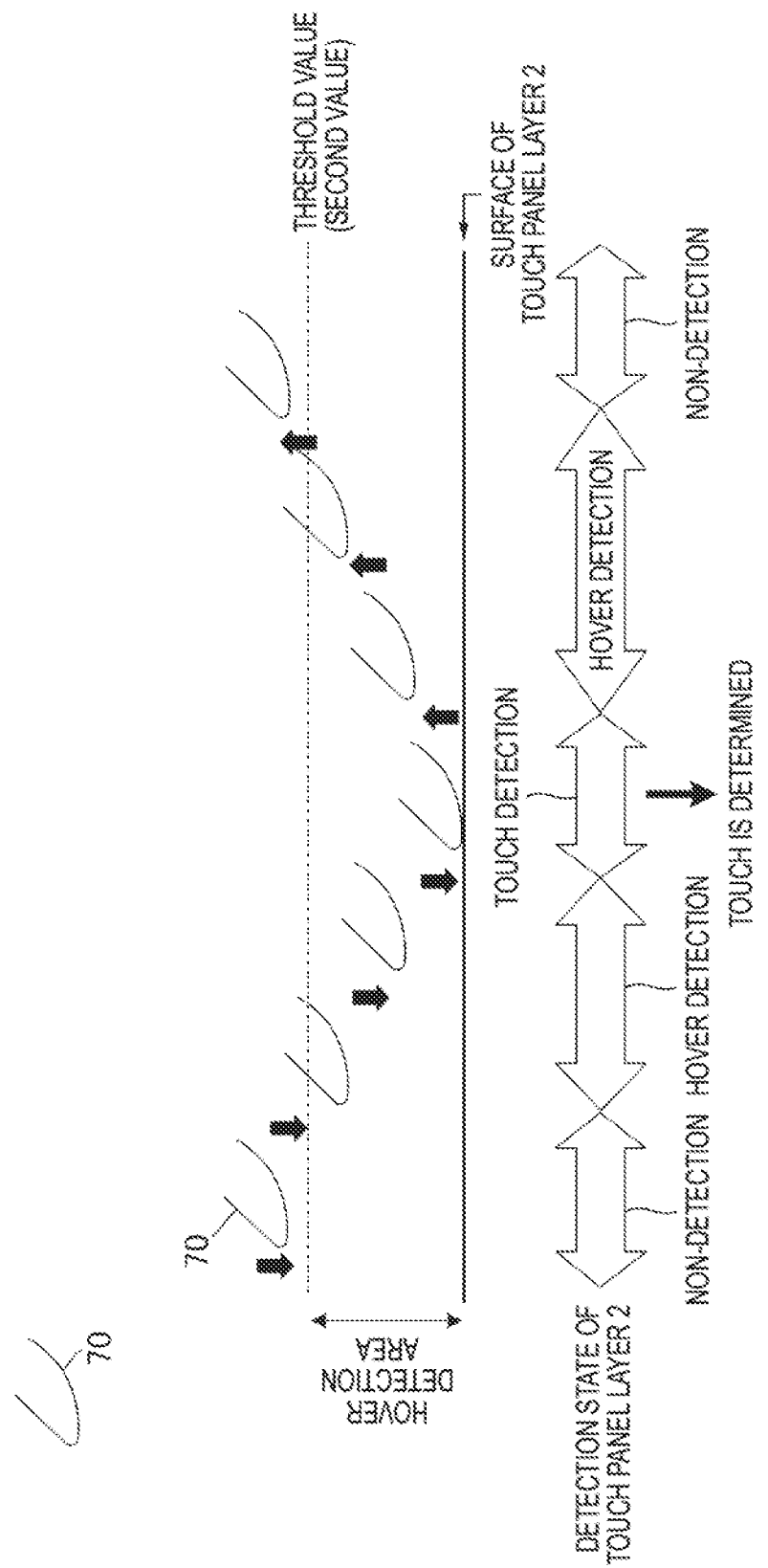

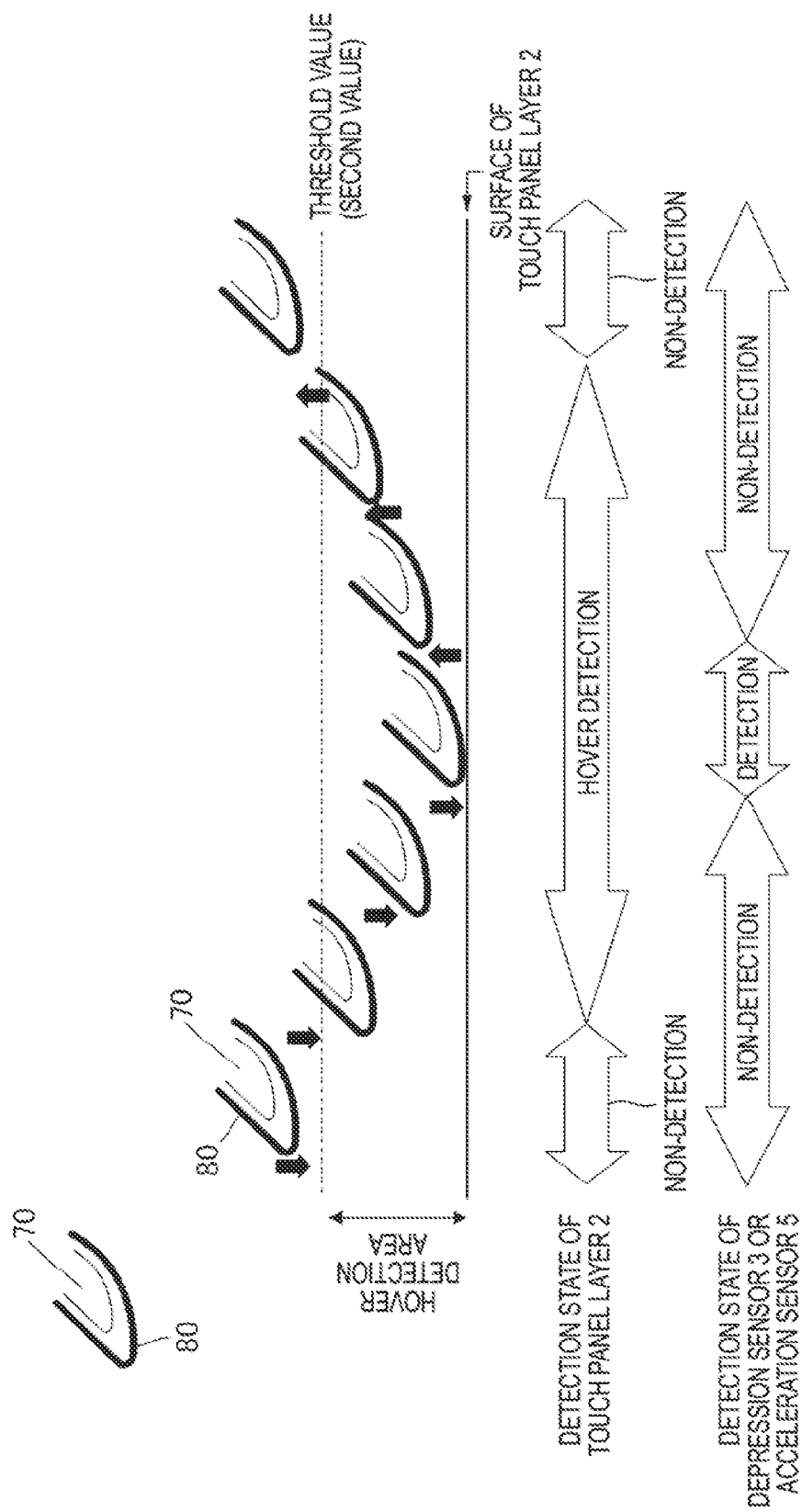

ELECTRONIC DEVICE AND COORDINATE DETECTION METHOD

BACKGROUND

The present disclosure relates to an electronic device having a touch panel and a coordinate detection method used in the electronic device.

As widely known, a touch panel is configured by combining a display device such as a liquid crystal panel and a touch pad (position input device).

The touch panel includes a capacitive touch panel that allows an operation at a height within a predetermined range without contact of a finger with a panel surface (this proximity operation is called a hover operation). FIG. 22 illustrates the schematic configuration of the capacitive touch panel. In FIG. 22, transmission electrode 101 and reception electrode 102 are disposed on the undersurface of plate-like dielectric 100 so as to be spaced apart from each other, and a drive pulse is applied to transmission electrode 101 from drive buffer 103. An electric field is generated when the drive pulse is applied and, when a hand is put into the electric field, the number of electric flux lines between transmission electrode 101 and reception electrode 102 is reduced. This change in electric flux line is manifested as a change in electric charge in reception electrode 102. The approach of the hand to the touch panel is detected from the change in electric charge in reception electrode 102. FIG. 23 illustrates a detection state of a finger when the hand is gradually moved toward the touch panel. In FIG. 23, (a) illustrates a state when the hand is away from the electric field, (b) illustrates a finger hover detection state when the finger has entered the electric field, and (c) illustrates a finger touch detection state when the finger is completely in the electric field and touches the touch panel.

An example of the prior art of the capacitive touch panel includes a touch switch described in JP-A-2009-181232. The touch switch described in JP-A-2009-181232 has, in a touch panel as a touch operation part for an operator, a plurality of detection means for detecting the touch operation of the touch panel, and detects a touch operation position in the touch panel by monitoring a change in the detection values of the detection means and determining the position of the detection means of which the detection value is changed as the touch operation position. The touch switch includes a first touch operation determination means for determining the presence or absence of the touch operation by detecting whether or not the detection value exceeds a first threshold value as a determination criterion of the touch operation, and a second touch operation means that extracts the detection position as the touch operation position in the case where a characteristic value of the detection value has a high value when the detection value does not exceed the first threshold value but exceeds a second threshold value set to a value lower than the first threshold value, and does not extract the detection position as the touch operation position in the case where the characteristic value of the detection value has a low value.

Incidentally, in the capacitive touch panel, in the case where a hand is covered with a glove, the capacitive touch panel cannot differentiate between an operation with a finger covered with the glove and the hover state of a finger that is not covered with the glove. In addition, even when the touch panel is touched, the touch cannot be detected correspondingly to the thickness of the glove, and hence it is not possible to detect which part of the touch panel is pushed.

In order to detect a touch with a glove, it is possible to detect the touch with a glove by detecting a depression during the detection of a hover state. However, when an electronic device having the capacitive touch panel is held by a left hand and a display surface is touched with a gloved right hand, if the left hand is moved by the pushing force, there are cases where a force for pushing the display surface is lessened and the depression cannot be detected. In these cases, it is not possible to detect which part of the touch panel is pushed.

In addition, in the capacitive touch panel, in the case where the capacitive touch panel is operated with a nail, the capacitive touch panel cannot differentiate between the operation with the nail and the hover state of the finger. In particular, touch determination for the touch panel is performed in the case where a skin (conductive substance) having an area not less than a predetermined area comes in contact with the touch panel, and hence the touch determination is not performed when the touch panel is touched with a long nail or an artificial nail. Consequently, in this case as well, it is not possible to detect which part of the touch panel is pushed.

SUMMARY

The present disclosure has been achieved in view of the above circumstances, and an object thereof is to provide an electronic device capable of detecting which part of the touch panel is pushed even in the case where the touch panel is touched with a glove or a nail, to say nothing of the case where the touch panel is touch with a finger and a coordinate detection method used in the electronic device.

An electronic device of the present disclosure is an electronic device including a housing, a planar display section disposed in the housing, a planar transparent member having a predetermined transmittance, disposed so as to overlap the display section, and having a part exposed from the housing, a touch panel layer disposed so as to overlap the display section and disposed between the display section and the transparent member, and configured to detect two-dimensional coordinates of an indicator having a predetermined conductivity along a surface of the display section and a vertical distance to the indicator from the surface of the display section, and an acceleration detection section configured to detect at least one of an acceleration of the housing and an acceleration of the transparent member, wherein the two-dimensional coordinates are determined as effective coordinates when the vertical distance is equal to or smaller than a first value, and the two-dimensional coordinates are determined as the effective coordinates when the vertical distance is more than the first value and is equal to or smaller than a second value more than the first value, and the acceleration detection section detects a predetermined acceleration.

According to the above configuration, when the vertical distance between the indicator and the touch panel layer is equal to or smaller than the first value, the two-dimensional coordinates at that point are determined as the effective coordinates and, when the vertical distance between the indicator and the touch panel layer is more than the first value and is equal to or smaller than the second value more than the first value (i.e., a hover state), and the acceleration detection section detects the predetermined acceleration, the two-dimensional coordinates at that point are determined as the effective coordinates. Consequently, it becomes possible to detect which part of a touch panel is pushed even in the case where the touch panel is touched with a glove or a nail, to say nothing of the case where the touch panel is touched with a finger.

In the above configuration, a depression detection section configured to detect a warp of the transparent member is provided, the two-dimensional coordinates are determined as the effective coordinates when the vertical distance is equal to or smaller than the first value, and the two-dimensional coordinates are determined as the effective coordinates when the vertical distance is more than the first value and is equal to or smaller than the second value, and at least one of the depression detection section detects a predetermined warp and the acceleration detection section detects the predetermined acceleration is satisfied.

According to the above configuration, when the vertical distance between the indicator and the touch panel layer is equal to or smaller than the first value, the two-dimensional coordinates at that point are determined as the effective coordinates and, when the vertical distance between the indicator and the touch panel layer is more than the first value and is equal to or smaller than the second value more than the first value (i.e., the hover state), and at least one of the depression detection section detects the predetermined warp and the acceleration detection section detects the predetermined acceleration is satisfied, the two-dimensional coordinates at that point are determined as the effective coordinates. Consequently, it becomes possible to detect which part of the touch panel is pushed even in the case where the touch panel is touched with the glove or the nail, to say nothing of the case where the touch panel is touched with the finger.

In the above configuration, the two-dimensional coordinates are determined as the effective coordinates when the vertical distance is equal to or smaller than the first value, and at least one of the depression detection section detects the predetermined warp and the acceleration detection section detects the predetermined acceleration is satisfied, and the two-dimensional coordinates are determined as the effective coordinates when the vertical distance is more than the first value and is equal to or smaller than the second value, and at least one of the depression detection section detects the predetermined warp and the acceleration detection section detects the predetermined acceleration is satisfied.

According to the above configuration, when the vertical distance between the indicator and the touch panel layer is equal to or smaller than the first value, and at least one of the depression detection section detects the predetermined warp and the acceleration detection section detects the predetermined acceleration is satisfied, the two-dimensional coordinates at that point are determined as the effective coordinates and, when the vertical distance between the indicator and the touch panel layer is more than the first value and is equal to or smaller than the second value, and at least one of the depression detection section detects the predetermined warp and the acceleration detection section detects the predetermined acceleration is satisfied, the two-dimensional coordinates at that point are determined as the effective coordinates, and hence it becomes possible to detect which part of the touch panel is pushed even in the case where the touch panel is touched with the glove or the nail, to say nothing of the case where the touch panel is touched with the finger.

In the above configuration, the predetermined acceleration includes an acceleration having a first frequency and an acceleration having a second frequency higher than the first frequency.

According to the above configuration, when the acceleration having the first frequency is detected, it is possible to determine that the touch panel is touched with the glove and, when the acceleration having the second frequency higher than the first frequency is detected, it is possible to determine that the touch panel is touched with the nail. That is, when the touch panel is touched with the nail, the acceleration having the high frequency is detected, and hence it is possible to determine that the touch panel is touched with the nail when the acceleration having the second frequency higher than the first frequency is detected.

In the above configuration, the display section is configured to display corresponding to the effective two-dimensional coordinates.

According to the above configuration, for example, the display of a pointer or an icon is allowed.

In the above configuration, the first value is 0.

According to the above configuration, it is possible to determine a touch state.

In the above configuration, the transparent member and the touch panel layer are integrated into one piece.

In the above configuration, the display section is in the shape of a quadrangle, and the depression detection section is disposed at least a side of the quadrangle.

In the above configuration, the display section is in the shape of a rectangle, and the depression detection section is disposed along one of short sides of the rectangle.

In the above configuration, a home key is provided on a side of a predetermined short side of the rectangle, and the depression detection section is disposed along the predetermined short side.

In the above configuration, a part of the depression detection section is disposed so as to overlap the touch panel layer.

In the above configuration, the depression detection section is disposed on the transparent member.

In the above configuration, the depression detection section is disposed on the touch panel layer.

In the above configuration, the depression detection section is disposed on the display section.

In the above configuration, the transparent member is a first transparent member, the display section includes a planar second transparent member and a third transparent member disposed so as to overlap the planar second transparent member, the planar second transparent member is disposed at a position closer to the touch panel layer than the third transparent member, a part of the third transparent member protrudes outward from the planar second transparent member at an end of the display section, and the depression detection section is disposed on a part of at least one of the transparent member and the touch panel layer corresponding to the protruding part of the third transparent member.

In the above configuration, the second transparent member and the third transparent member constitute a liquid crystal display section or an organic EL display section.

In the above configuration, the display section and the transparent member are spaced apart from each other by a predetermined distance.

A coordinate detection method of the present disclosure is a coordinate detection method usable in an electronic device including a housing, a planar display section disposed in the housing, a planar transparent member having a predetermined transmittance, disposed so as to overlap the display section, and having at least a part exposed from the housing, a touch panel layer disposed so as to overlap the display section and disposed between the display section and the transparent member, and configured to detect two-dimensional coordinates of an indicator having a predetermined conductivity along a surface of the display section and a vertical distance to the indicator from the surface of the display section, and an acceleration detection section configured to detect at least one of an acceleration of the housing and an acceleration of the transparent member, the coordinate detection method including determining at least the two-dimensional coordinates as effective coordinates when the vertical distance is equal to or smaller than a first value, and determining the two-dimensional coordinates as the effective coordinates when the vertical distance is more than the first value and is equal to or smaller than a second value more than the first value, and the acceleration detection section detects a predetermined acceleration.

According to the above method, when the vertical distance between the indicator and the touch panel layer is equal to or smaller than the first value, the two-dimensional coordinates at that point are determined as the effective coordinates and, when the vertical distance between the indicator and the touch panel layer is more than the first value and is equal to or smaller than the second value more than the first value (i.e., the hover state), and the acceleration detection section detects the predetermined acceleration, the two-dimensional coordinates at that point are determined as the effective coordinates. Consequently, it becomes possible to detect which part of the touch panel is pushed even in the case where the touch panel is touched with the glove or the nail, to say nothing of the case where the touch panel is touched with the finger.

According to the present disclosure, it is possible to detect which part of the touch panel is pushed even in the case where the touch panel is touched with the glove or the nail, to say nothing of the case where the touch panel is touched with the finger.

BRIEF DESCRIPTION OF THE DRAWINGS

FIG. 6 illustrates determination of a control section in a detection state of each of the touch panel layer, the depression sensor, the acceleration sensor, and the impact sensor of the electronic device of FIG. 1.

FIG. 8 illustrates the detection state of a finger in the case where a finger is gradually moved toward the touch panel layer and is gradually moved away from the touch panel layer after the finger comes in contact with the touch panel layer in the electronic device of FIG. 1.

FIG. 9 illustrates the detection state of a glove in the case where a finger covered with a glove is gradually moved toward the touch panel layer and is gradually moved away from the touch panel layer after the finger covered with the glove comes in contact with the touch panel layer in the electronic device of FIG. 1.

DETAILED DESCRIPTION OF EXEMPLARY EMBODIMENTS

Hereinbelow, a preferred mode for carrying out the invention will be described in detail with reference to the drawings.

Figure 1:
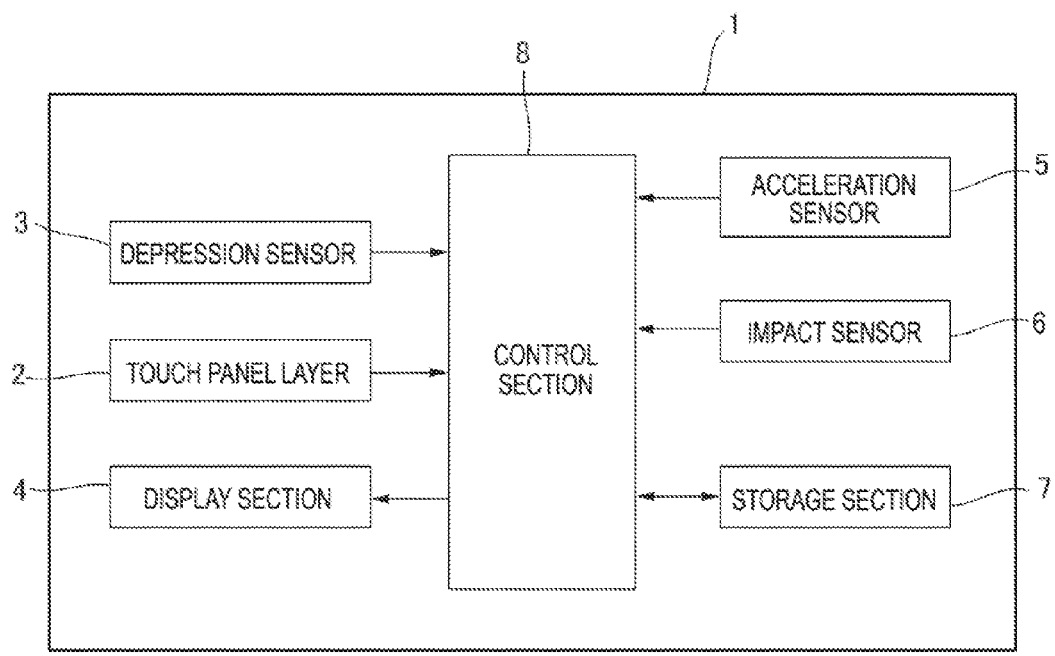
FIG. 1 is a block diagram illustrating the schematic configuration of an electronic device according to an embodiment of the present disclosure.
Figure 2:
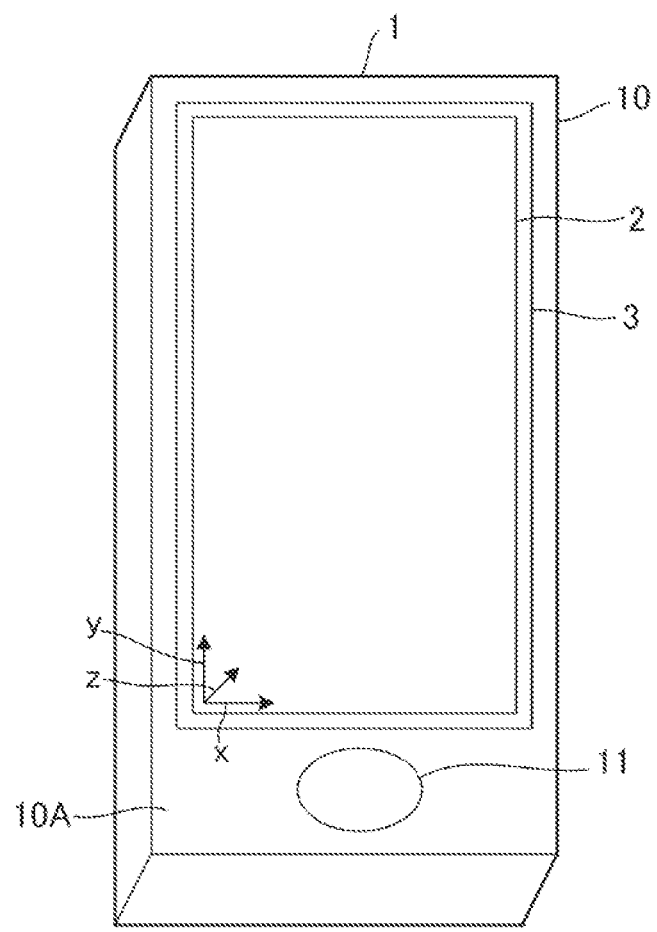
FIG. 2 is a perspective view illustrating the outer appearance of the electronic device of FIG. 1.

FIG. 1 is a block diagram illustrating the schematic configuration of an electronic device according to an embodiment of the present disclosure. FIG. 2 is a perspective view illustrating the outer appearance of the electronic device of FIG. 1. Electronic device 1 according to the present embodiment is the present disclosure applied to, e.g., a portable radio device called "smartphone". Note that the portion functioning as the wireless device is omitted in the block diagram of FIG. 1.

In FIG. 1, electronic device 1 according to the present embodiment includes touch panel layer 2, depression sensor (corresponds to a depression detection section) 3, display section 4, acceleration sensor 5, impact sensor 6, storage section 7, and control section 8. In addition, as shown in FIG. 2, electronic device 1 according to the present embodiment has oblong rectangular housing 10, and touch panel layer 2, depression sensor 3, and home key 11 are disposed on the side of front surface 10A of housing 10. Touch panel layer 2 is disposed to overlap depression sensor 3 at a position closer to the front surface than depression sensor 3. Home key 11 is disposed immediately below touch panel layer 2 and depression sensor 3 on the front surface side of housing 10. Note that, though not illustrated in FIG. 2, protective glass (corresponds to a transparent member) is disposed on the front surface side of touch panel layer 2, and display section 4 is disposed at a position closer to the internal part of housing 10 than depression sensor 3.

Figure 3:
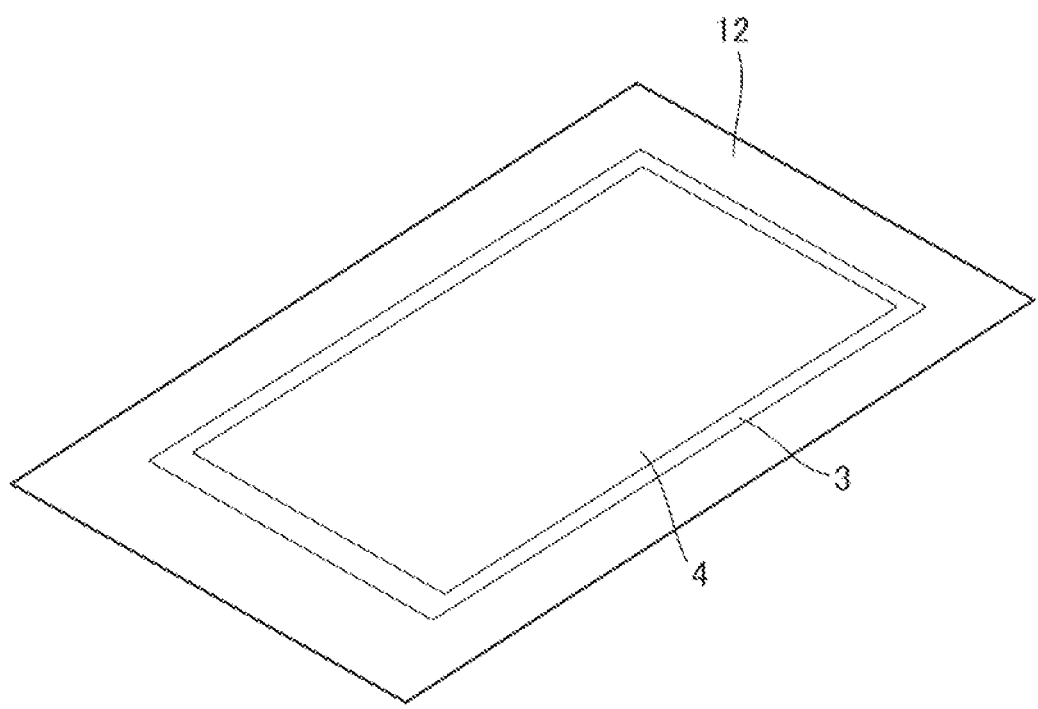
FIG. 3 illustrates an arrangement of glass, a depression sensor, and a display section of the electronic device of FIG. 1.

FIG. 3 illustrates an arrangement of protective glass 12, depression sensor 3, and display section 4. As illustrated in FIG. 3, display section 4 and depression sensor 3 are disposed in that order below glass 12. Glass 12 is planar, has a predetermined transmittance in visible light, and allows passage of the display of display section 4. In addition, at least a part of glass 12 is disposed so as to be exposed from housing 10, and the other part thereof is disposed inside housing 10. Note that touch panel layer 2 is disposed so as to be in contact with the undersurface of glass 12.

Each of touch panel layer 2 and display section 4 has a planar shape having an area slightly smaller than the area of the front surface of housing 10, and is formed into an oblong rectangular shape as viewed in a plan view. In this case, the area of display section 4 is slightly smaller than that of touch panel layer 2.

Figure 22:
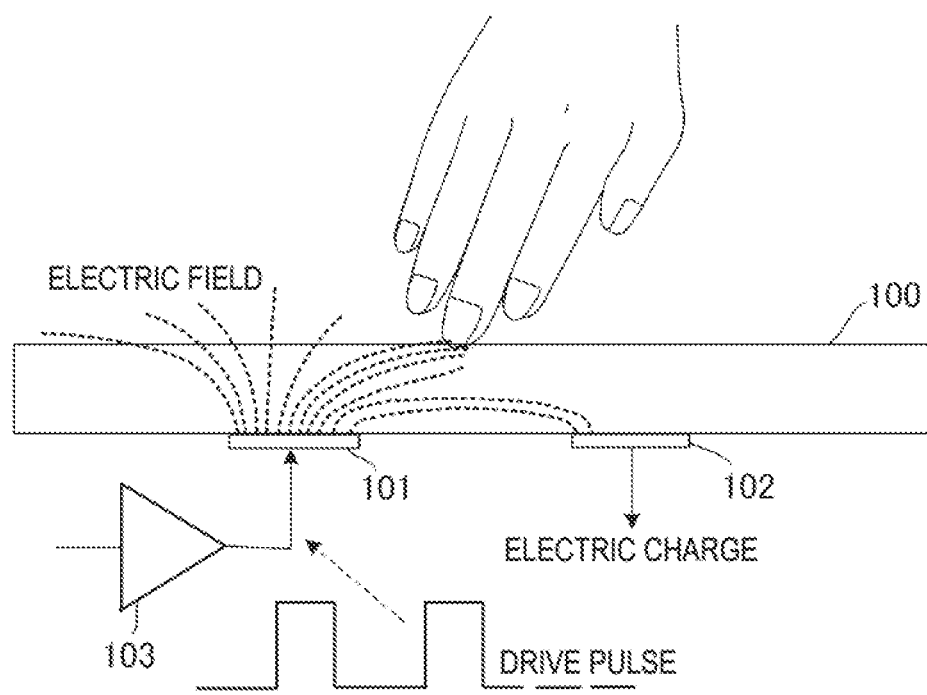
FIG. 22 illustrates the schematic configuration of a capacitive touch panel.
Figure 23:
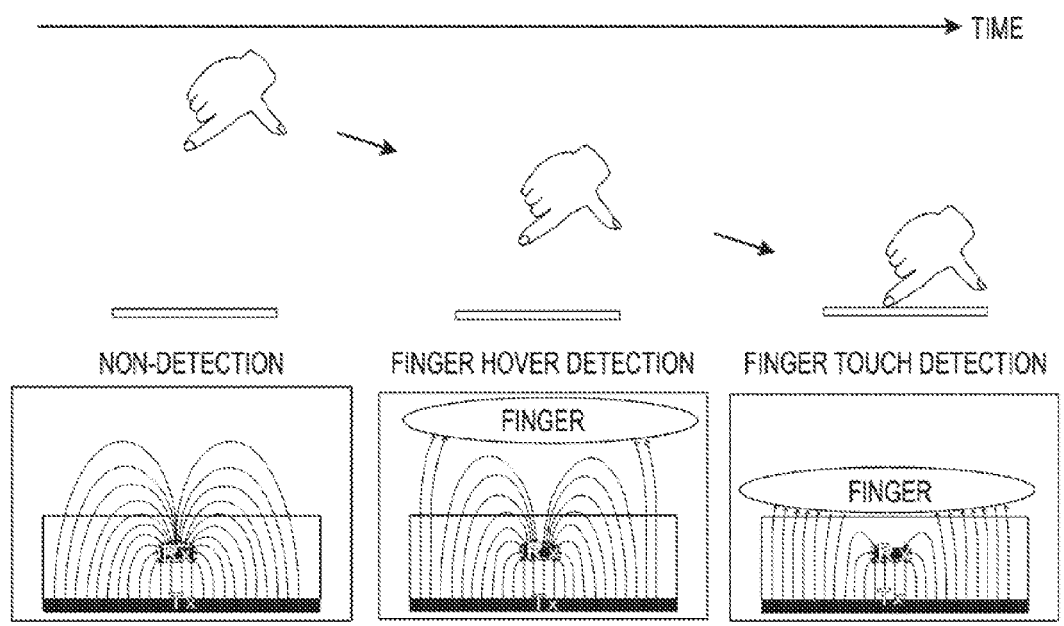
FIG. 23 illustrates the detection state of a finger when a hand is gradually moved toward a touch panel.

Touch panel layer 2 adopts a capacitive system that allows an operation at a height within a predetermined range without contact of an indicator (the indicator denotes a skin part of a finger, a dedicated pen, or the like, and mainly denotes "a finger" in the present embodiment) with a panel surface (this operation is referred to as "a hover operation"). As illustrated in FIG. 22 described above, touch panel layer 2 adopting the capacitive system includes transmission electrode 101 and reception electrode 102, and they are disposed on the undersurface of plate-like dielectric 100 so as to be spaced apart from each other. The drive pulse based on a transmission signal is applied to transmission electrode 101. The electric field is generated from transmission electrode 101 by the application of the drive pulse to transmission electrode 101 and, when a finger enters into the electric field, the number of electric flux lines between transmission electrode 101 and reception electrode 102 is reduced, and the change in the number thereof is manifested as the change in electric charge in reception electrode 102. Touch panel layer 2 detects the finger from a reception signal corresponding to the change in electric charge in reception electrode 102, detects coordinates (x, y) of the finger along the surface of display section 4, also detects a vertical distance (z) to the finger, and outputs the detected two-dimensional coordinates (x, y) and vertical distance (z) to control section 8.

Returning to FIG. 1, depression sensor 3 detects at least a warp of protective glass 12. Display section 4 has a rectangular shape, and is used for display for operating electronic device 1 and display of images or the like. Display section 4 includes LCD (Liquid Crystal Display) and a backlight, and display section 4 is disposed on the back surface side of touch panel layer 2 in such a way that LCD faces touch panel layer 2. Note that display section 4 has LCD, but may also have display devices such as organic EL (Electro Luminescence) and electronic paper in addition to LCD. Acceleration sensor 5 is a device for detecting an acceleration having a relatively low frequency, and is used for determination of the touch operation with a glove. That is acceleration sensor 5 is used for the detection of the acceleration obtained when the operation is performed with a left hand holding housing 10 and a right hand covered with a glove. Impact sensor 6 is a device for detecting an acceleration having a frequency higher than that detected by acceleration sensor 5, and is used for determination of the touch operation with a nail. That is, impact sensor 6 is used for the detection of the acceleration obtained when the operation is performed with a nail.

Figure 4:
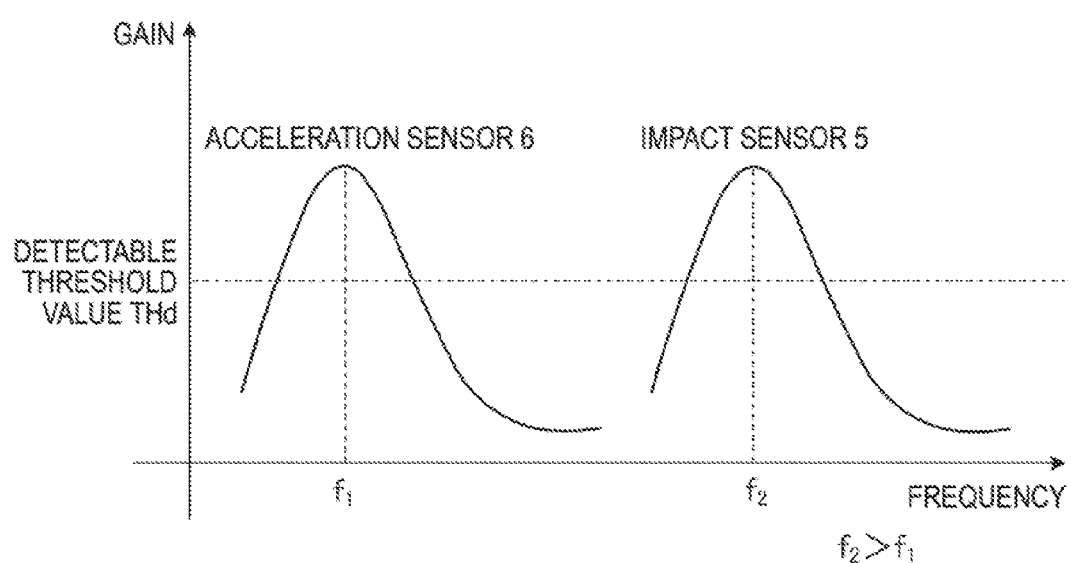
FIG. 4 illustrates frequency characteristics of an acceleration sensor and an impact sensor of the electronic device of FIG. 1.

FIG. 4 illustrates frequency characteristics of acceleration sensor 5 and impact sensor 6. The center frequency of acceleration sensor 5 is $f_1$, and the center frequency of impact sensor 6 is $f_2$ that is higher than the center frequency $f_1$ of acceleration sensor 5. By detecting the acceleration exceeding a detectable threshold value THd at the frequency $f_1$, it is possible to determine that the touch operation is performed with the glove. In addition, by detecting the acceleration exceeding the detectable threshold value THd at the frequency $f_2$, it is possible to determine that the touch operation is performed with the nail. Note that these determinations are made by control section 8.

Returning to FIG. 1, storage section 7 has a volatile memory such as DRAM (Dynamic Random Access Memory) or the like, and, when a user performs setting in order to use electronic device 1, storage section 7 stores the setting. Control section 8 controls each section of electronic device 1, and includes CPU (Central Processing Unit), ROM (Read Only Memory), RAM (Random Access Memory), and an interface circuit. A program for controlling CPU is stored in ROM, and RAM is used in the operation of CPU.

Figure 5:
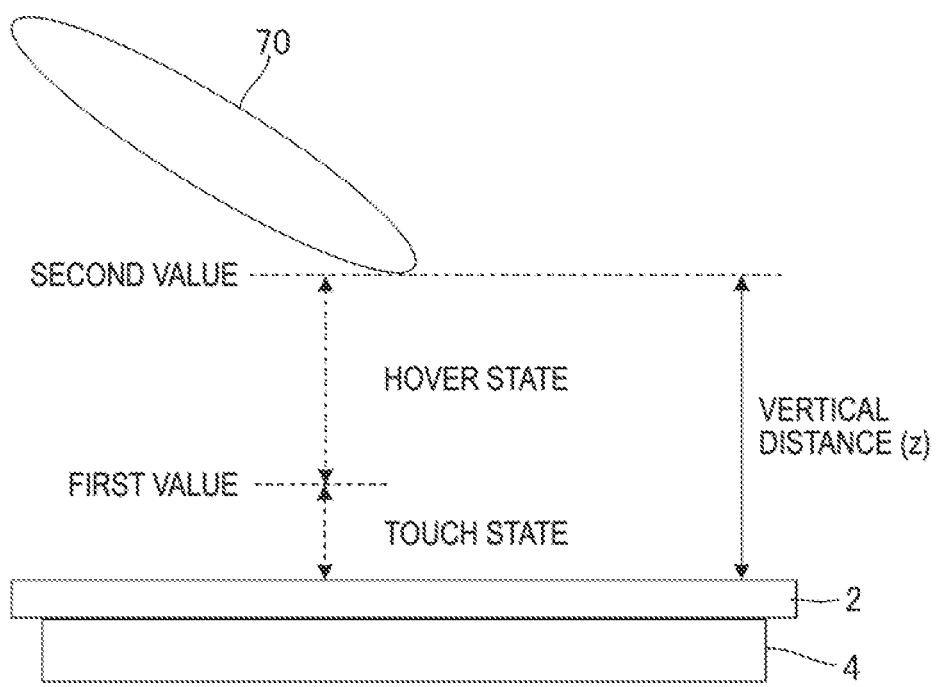
FIG. 5 illustrates a positional relationship between a touch panel layer and a finger of the electronic device of FIG. 1.

Herein, the positional relationship between touch panel layer 2 and finger 70 as the indicator (Any indicator may be used as long as it has a predetermined conductivity. For example, a part of a skin or a dedicated pen may also be used) will be described. FIG. 5 illustrates the positional relationship between touch panel layer 2 and finger 70 as the indicator. As illustrated in FIG. 5, in the case where the vertical distance (z) to finger 70 above touch panel layer 2 is equal to or smaller than a first value, a touch state is established. On the other hand, in the case where the vertical distance (z) to finger 70 is equal to or smaller than a second value that is larger than the first value, a hover state is established.

Control section 8 determines two-dimensional coordinates (x, y) as effective coordinates at least in the following cases described in (1) to (5).

(1) In the case where the vertical distance (z) outputted from touch panel layer 2 is equal to or smaller than the first value (i.e., in the case of the touch state), at least two-dimensional coordinates (x, y) outputted from touch panel layer 2 are determined as effective coordinates.

(2) In the case where the vertical distance (z) outputted from touch panel layer 2 is equal to or smaller than the first value (i.e., in the case of the touch state), depression sensor 3 detects a predetermined warp, and acceleration sensor 5 (or impact sensor 6) detects a predetermined acceleration, al least two-dimensional coordinates (x, y) outputted from touch panel layer 2 are determined as effective coordinates.

(3) In the case where the vertical distance (z) outputted from touch panel layer 2 is equal to or smaller than the first value (i.e., in the case of the touch state), depression sensor 3 detects the predetermined warp, and acceleration sensor 5 (or impact sensor 6) detects the predetermined acceleration, at least two-dimensional coordinates (x, y) outputted from touch panel layer 2 are determined as effective coordinates.

(4) In the case where the vertical distance (z) outputted from touch panel layer 2 is more than the first value and is equal to or smaller than the second value (i.e., in the case of the hover state), depression sensor 3 detects the predetermined warp, and acceleration sensor 5 (or impact sensor 6) detects the predetermined acceleration, at least two-dimensional coordinates (x, y) outputted from touch panel layer 2 are determined as effective coordinates.

(5) In the case where the vertical distance (z) outputted from touch panel layer 2 is more than the first value and is equal to or smaller than the second value (in the case of the hover state), and depression sensor 3 detects the predetermined warp or acceleration sensor 5 (or impact sensor 6) detects the predetermined acceleration, at least two-dimensional coordinates (x, y) outputted from touch panel layer 2 are determined as effective coordinates.

FIG. 6 illustrates the determination of control section 8 in the detection state of each of touch panel layer 2, depression sensor 3, acceleration sensor 5, and impact sensor 6. In FIG. 6, ○ denotes "detection", x denotes "non-detection", and - denotes "unchecked". A detection state A is a state in which touch panel layer 2 detects a touch, depression sensor 3 does not detect the warp of glass 12, and acceleration sensor 5 does not detect the acceleration. When this state is established, control section 8 can detect a finger (feather touch) irrespective of the detection of the acceleration by impact sensor 6. A detection state B is a state in which touch panel layer 2 detects the touch, and depression sensor 3 detects the warp of glass 12. When this state is established, control section 8 can detect a finger (push) irrespective of the detection of the acceleration by acceleration sensor 5 and impact sensor 6. A detection state C is a state in which touch panel layer 2 detects the touch, and acceleration sensor 5 detects the acceleration. When this state is established, control section 8 can detects the finger (push) irrespective of the detection of the warp of glass 12 by depression sensor 3 and irrespective of the detection of the acceleration by impact sensor 6.

A detection state D is a state in which touch panel layer 2 detects a hover. When this state is established, control section 8 determines the hover. A detection state E is a state in which touch panel layer 2 detects the hover, and depression sensor 3 detects the warp of glass 12. When this state is established, control section 8 can detects a glove irrespective of the detection of the acceleration by acceleration sensor 5 and impact sensor 6. A detection state F is a state in which touch panel layer 2 detects the hover, and acceleration sensor 5 detects the acceleration. When this state is established, control section 8 can detect the glove. A detection state G is a state in which touch panel layer 2 detects the hover, and impact sensor 6 detects the acceleration. When this state is established, control section 8 can detect a nail.

Figure 7B:
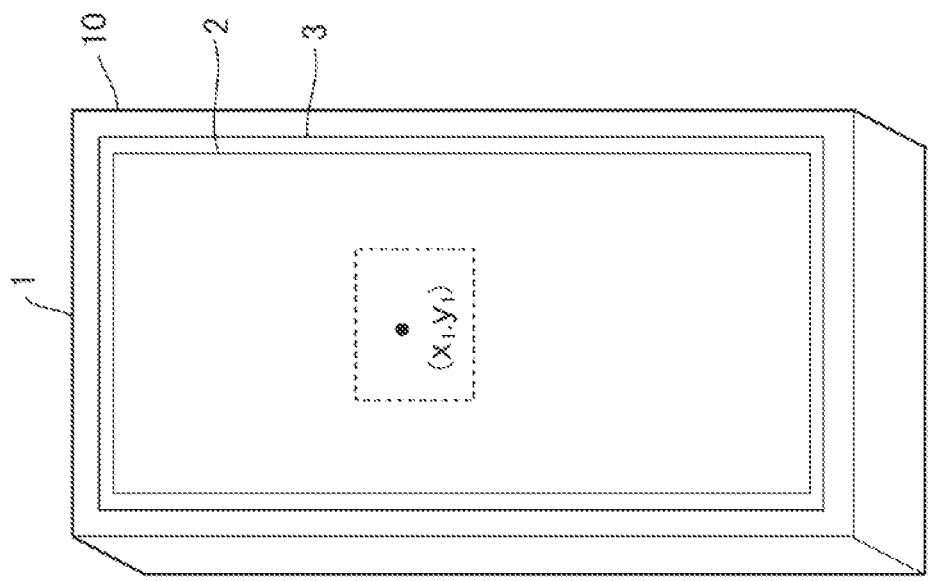
FIGS. 7A and 7B illustrate examples in which an icon is displayed in the electronic device of FIG. 1.
Figure 7A:
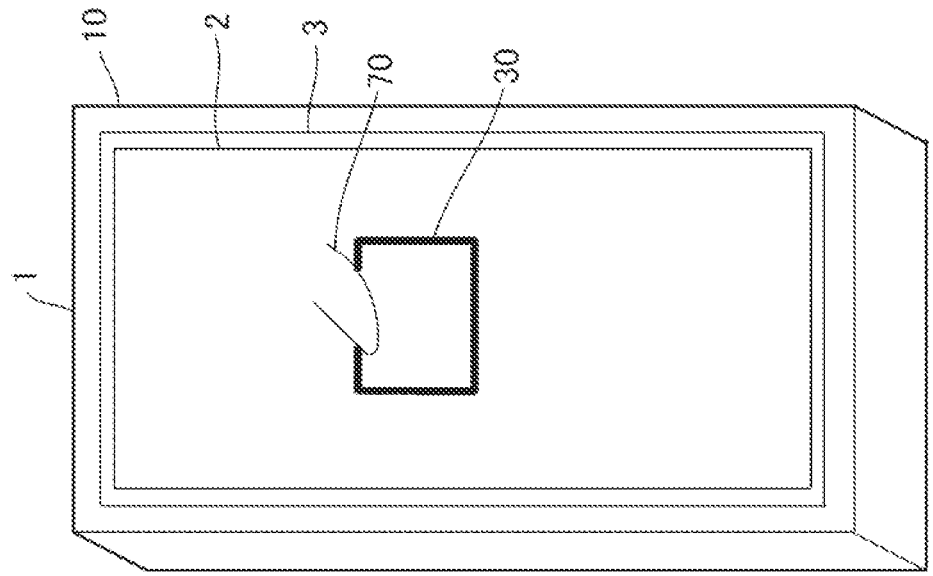

Returning to FIG. 1, display section 4 performs display corresponding to effective coordinates (x, y). For example, display section 4 displays a pointer and an icon. FIGS. 7A and 7B illustrate an example in which the icon is displayed. As illustrated in FIG. 7A, in the case where the two-dimensional coordinates ($x_1$, $y_1$) are the effective coordinates, icon 30 is displayed as illustrated in FIG. 7B. Note that the pointer (not illustrated) may also be displayed correspondingly to the effective coordinates (x, y). In the case where the point overlaps the icon, it is possible to bring the icon into a selectable state, and activate the function corresponding to the icon when finger 70 approaches touch panel layer 2 such that the vertical distance becomes equal to or smaller than the first value in the selectable state. The display of the pointer or the icon and the activation of the function corresponding to the icon are performed by control section 8. Note that the first value of the vertical distance may be 0 (zero).

Next, the operation of electronic device 1 according to the present embodiment will be described.

FIG. 8 illustrates the detection state of finger 70 in the case where finger 70 is gradually moved toward touch panel layer 2 and is gradually moved away from touch panel layer 2 after finger 70 comes in contact with touch panel layer 2. In FIG. 8, when the vertical distance (z) between finger 70 and touch panel layer 2 is more than the threshold value (the second value), the detection state of touch panel layer 2 is "non-detection". Thereafter, when the vertical distance (z) becomes equal to or smaller than the threshold value (the second value), the detection state of touch panel layer 2 becomes "hover detection". Thereafter, when finger 70 approaches touch panel layer 2 so as to come in contact with the surface of touch panel layer 2 (actually the surface of glass 12), the detection state of touch panel layer 2 becomes "touch detection". At this point, control section 8 determines the touch. Thereafter, when finger 70 is moved away from the surface of touch panel layer 2, the detection state of touch panel layer 2 becomes "hover detection". This state in which the hover is detected continues until the vertical distance (z) between finger 70 and touch panel layer 2 exceeds the threshold value (the second value) and, when the vertical distance (z) exceeds the threshold value (the second value), the detection state of touch panel layer 2 becomes "non-detection".

FIG. 9 illustrates the detection state of glove 80 in the case where finger 70 covered with glove 80 is gradually moved toward touch panel layer 2 and is moved away from touch panel layer 2 after glove 80 comes in contact with touch panel layer 2.

In FIG. 9, when the vertical distance (z) between finger 70 and touch panel layer 2 is more than the threshold value (the second value), the detection state of touch panel layer 2 is "non-detection". Thereafter, when the vertical distance (z) becomes equal to or smaller than the threshold value (the second value), the detection state of touch panel layer 2 becomes "hover detection". The state in which the hover is detected continues even when glove 80 comes in contact with the surface of touch panel layer 2. In addition, this state in which the hover is detected continues until the vertical distance (z) between finger 70 and touch panel layer 2 exceeds the threshold value (the second value) and, when the vertical distance (z) exceeds the threshold value (the second value), the detection state becomes "non-detection".

On the other hand, from when the vertical distance (z) between finger 70 and touch panel layer 2 is more than the threshold value (the second value) to when glove 80 comes in contact with touch panel layer 2, the detection state of depression sensor 3 or acceleration sensor 5 is "non-detection". Thereafter, when glove 80 comes in contact with the surface of touch panel layer 2, the detection state of depression sensor 3 or acceleration sensor 5 becomes "detection". Thereafter, when glove 80 is moved away from the surface of touch panel layer 2, the detection state of depression sensor 3 or acceleration sensor 5 becomes "non-detection".

Figure 10:
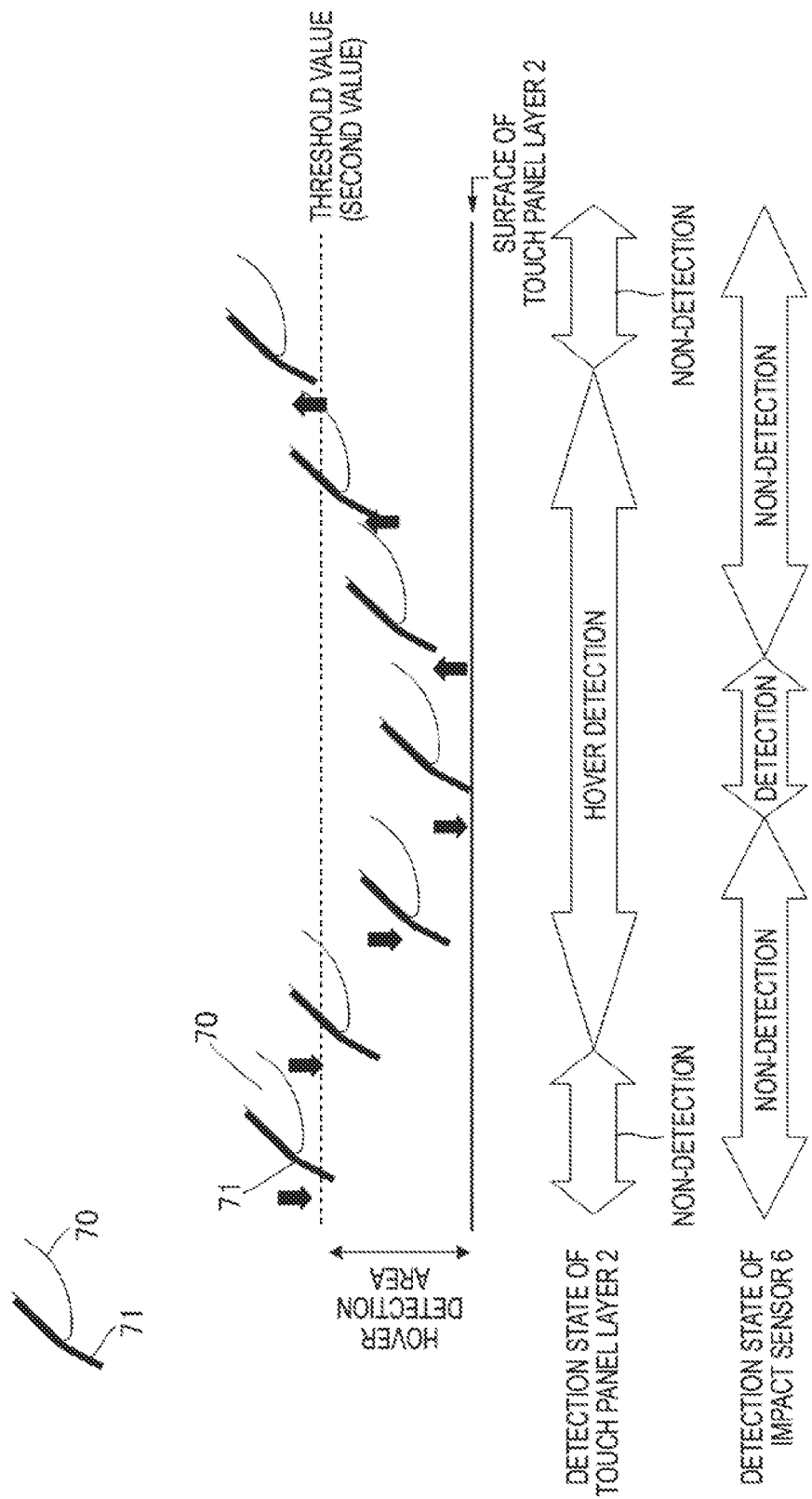
FIG. 10 illustrates the detection state of a nail in the case where a nail is gradually moved toward the touch panel layer and is gradually moved away from the touch panel layer after the nail comes in contact with the touch panel layer in the electronic device of FIG. 1.

FIG. 10 illustrates the detection state of nail 71 in the case where nail 71 is gradually moved toward touch panel layer 2 and is gradually moved away from touch panel layer 2 after nail 71 comes in contact with touch panel layer 2.

In FIG. 10, when the vertical distance (z) between finger 7 and touch panel layer 2 is more than the threshold value (the second value), the detection state of touch panel layer 2 is "non-detection". Subsequently, when the vertical distance (z) becomes equal to or smaller than the threshold value (the second value), the detection state of touch panel layer 2 becomes "hover detection". The state in which the hover is detected continues even when nail 71 comes in contact with the surface of touch panel layer 2. In addition, this state in which the hover is detected continues until the vertical distance (z) between finger 70 and touch panel layer 2 exceeds the threshold value (the second value) and, when the vertical distance (z) exceeds the threshold value (the second value), the detection state becomes "non-detection".

On the other hand, from when the vertical distance (z) between finger 70 and touch panel layer 2 is more than the threshold value (the second value) to when nail 71 comes in contact with touch panel layer 2, the detection state of impact sensor 6 is "non-detection". Subsequently, when nail 71 comes in contact with the surface of touch panel layer 2, the detection state of impact sensor 6 becomes "detection". Then, when nail 71 is moved away from the surface of touch panel layer 2, the detection state of impact sensor 6 becomes "non-detection".

Figure 11:
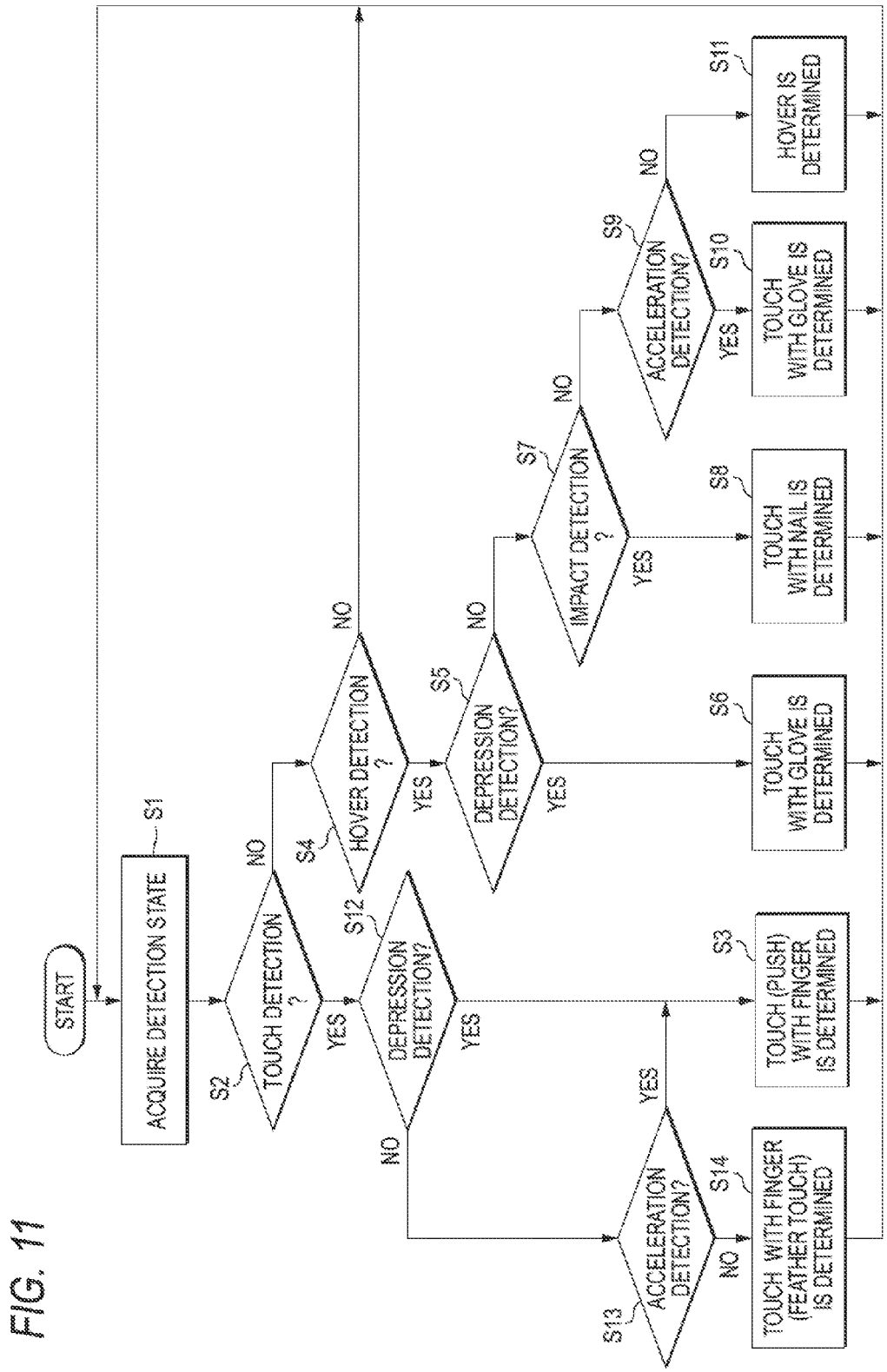
FIG. 11 is a flowchart showing indicator determination processing of the electronic device of FIG. 1.

Next, FIG. 11 is a flowchart showing indicator determination processing of electronic device 1 according to the present embodiment. In FIG. 11, control section 8 captures the output from each of touch panel layer 2, depression sensor 3, acceleration sensor 5, and impact sensor 6 to thereby acquire the detection state (Step 1). When acquiring the detection state, control section 8 determines whether or not the state is the touch detection (Step S2) and, in the case where control section 8 determines that the state is the touch detection (i.e., in the case where "YES" is determined in the determination in Step S2), control section 8 determines whether or not the state is depression detection (Step S12).

In the case where control section 8 determines that the state is the depression detection in the determination in Step S12 (i.e., in the case where "YES" is determined in the determination in Step S12), control section 8 determines that the state is a touch (push) with finger 70, and determines two-dimensional coordinates (x, y) as effective coordinates (Step S3). Thereafter, the processing returns to Step S1.

In the case where control section 8 determines that the state is not the depression detection in the determination in Step S12 (i.e., in the case where "NO" is determined in the determination in Step S12), control section 8 determines whether or not the state is acceleration detection (Step S13).

In the case where control section 8 determines that a predetermined acceleration is detected in the determination in Step S13 (i.e., in the case where "YES" is determined in the determination in Step S13), control section 8 determines that the state is the touch (push) with finger 70, and determines two-dimensional coordinates (x, y) as effective coordinates (Step S3). Thereafter, the processing returns to Step S1.

In the case where control section 8 determines that the predetermined acceleration is not detected in the determination in Step S13 (i.e., in the case where "NO" is determined in the determination in Step S13), control section 8 determines that the state is a touch (feather touch) with finger 70, and determines two-dimensional coordinates as effective coordinates (Step S14). Thereafter, the processing returns to Step S1.

In the case where control section 8 determines that the state is not the touch detection in the determination in Step S2 (i.e., in the case where "NO" is determined in the determination in Step S2), control section 8 determines whether or not the state is the hover detection (Step S4) and, in the case where control section 8 determines that the state is not the hover detection (i.e., in the case where NO is determined in the determination in Step S4), the processing returns to Step S1.

In contrast to this, in the case where control section 8 determines that the state is the hover detection (i.e., in the case where "YES" is determined in the determination in Step S4), control section 8 determines whether or not the state is the depression detection (Step S5). In the case where control section 8 determines that the state is the depression detection in the determination (i.e., in the case where "YES" is determined in the determination in Step S5), control section 8 determines that the state is a touch with glove 80, and determines two-dimensional coordinates (x, y) as effective coordinates (Step S6). After control section 8 determines that the state is the touch with glove 80, the processing returns to Step S1.

In the case where control section 8 determines that the state is not the depression detection in the determination in Step S5 (i.e., in the case where "NO" is determined in the determination in Step S5), control section 8 determines whether or not the state is impact detection (Step S7). In the case where control section 8 determines that the state is the impact detection in the determination (i.e., in the case where "YES" is determined in the determination in Step S7), control section 8 determines that the state is a touch with nail 71, and determines two-dimensional coordinates (x, y) as effective coordinates (Step S8). After control section 8 determines that the state is the touch with nail 71, the processing returns to Step S1.

In the case where control section 8 determines that the state is not the impact detection in the determination in Step S7 (i.e., in the case where "NO" is determined in the determination in Step S7), control section 8 determines whether or not the state is the acceleration detection (Step S9). In the case where control section 8 determines that the state is the acceleration detection in the determination (i.e., in the case where "YES" is determined in the determination in Step S9), control section 8 determines that the state is the touch with glove 80, and determines two-dimensional coordinates (x, y) as effective coordinates (Step S10). After control section 8 determines that the state is the touch with glove 80, the processing returns to Step S1.

In the case where control section 8 determines that the state is not the acceleration detection in the determination in Step S9 (i.e., in the case where "NO" is determined in the determination in Step S9), control section 8 determines that the state is the hover (Step S11). Thereafter, the processing returns to Step S1. Note that, in Step S11, two-dimensional coordinates (x, y) may or may not be determined as effective coordinates.

Note that it is not necessary to perform the determinations of Step S5, Step S7, and Step S9 in this order, and the order is arbitrary. For example, the determination of the acceleration detection may be performed first, the determination of the impact detection may be performed next, and the determination of the depression detection may be performed lastly.

Thus, according to electronic device 1 according to the present embodiment, touch panel layer 2, depression sensor 3, acceleration sensor 5, and impact sensor 6 are provided, it is determined that the state is the touch with a finger when the touch is detected by touch panel layer 2 and the two-dimensional coordinates outputted from touch panel layer 2 at the time of the detection are determined as effective coordinates, it is determined that the state is the touch with a glove when the hover is detected by touch panel layer 2 and depression sensor 3 detects the predetermined warp and the two-dimensional coordinates outputted from touch panel layer 2 at the time of the detection are determined as effective coordinates, it is determined that the state is the touch with a glove when the hover is detected by touch panel layer 2 and acceleration sensor 5 detects the predetermined acceleration and the two-dimensional coordinates outputted from touch panel layer 2 at the time of the detection are determined as effective coordinates, and it is determined that the state is the touch with a nail when the hover is detected by touch panel layer 2 and impact sensor 6 detects the predetermined acceleration and the two-dimensional coordinates outputted from touch panel layer 2 at the time of the detection are determined as effective coordinates, and hence it becomes possible to detect which part of the touch panel is pushed even in the case where the touch panel is touched with the glove or the nail, to say nothing of the case where the touch panel is touch with the finger.

That is, in the case where protective glass 12 is touched with the tip of a long nail or a finger covered with a glove, i.e., even in the case where the vertical distance is more than the first value, when depression sensor 3 detects the predetermined warp or when acceleration sensor 5 or impact sensor 6 detects the predetermined acceleration, the two-dimensional coordinates are determined as effective coordinates, and hence it is possible to input the two-dimensional coordinates even in the case of the tip of the nail or the tip of the finger covered with the glove.

Figure 12:
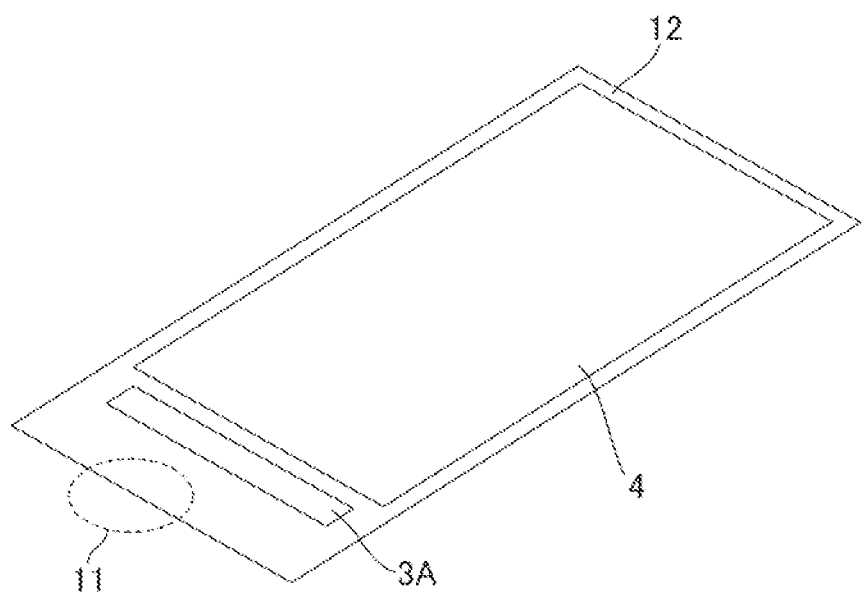
FIG. 12 is a perspective view illustrating an example in which a band-shaped depression sensor is disposed along one of short sides of the display section in the electronic device of FIG. 1.

Note that, in electronic device 1 according to the present embodiment, rectangular depression sensor 3 which is slightly greater than display section 4 is disposed below display section 4, but the present invention is not limited to this case. For example, as shown in FIG. 12, band-shaped depression sensor 3A may be disposed along one of two short sides of display section 4. As shown in FIG. 12, home key 11 is provided on one short side of the rectangle of display section 4 and depression sensor 3A is disposed along this short side. Thus, disposing depression sensor 3A using a space peripheral to home key 11 allows effective utilization of the space.

Figure 13:
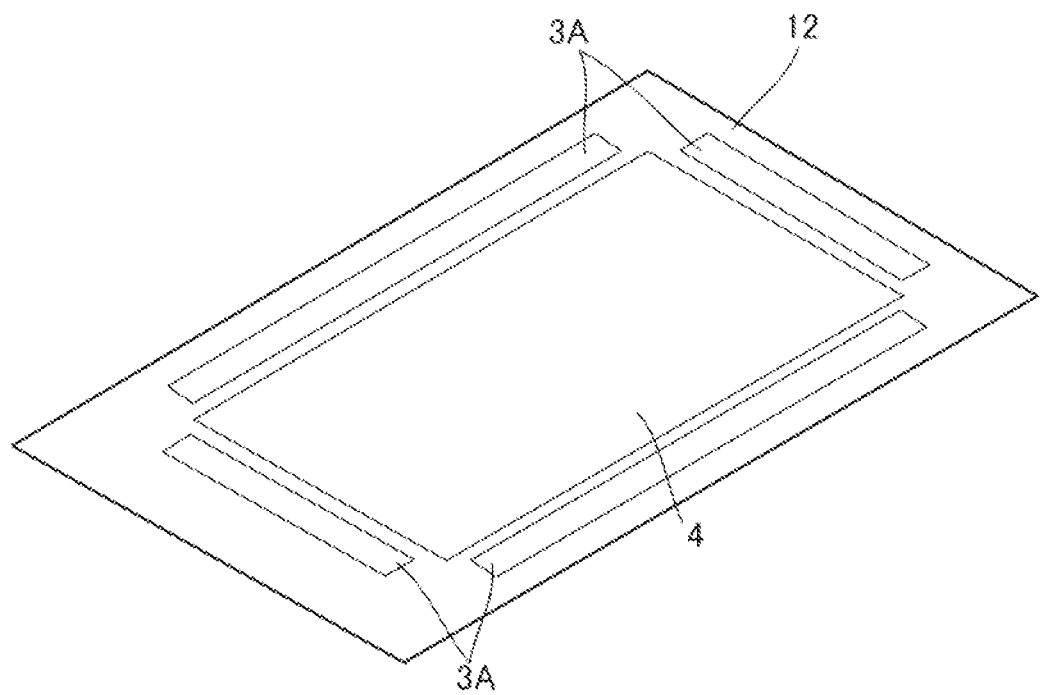
FIG. 13 is a perspective view illustrating an example in which four band-shaped depression sensors are used and disposed along four sides of the display section in the electronic device of FIG. 1.

Furthermore, as shown in FIG. 13, four band-shaped depression sensors 3A may be used, arranged along the four sides of display section 4 respectively or arranged along one side, two sides or three sides. In this case, since display section 4 has a rectangular shape, it goes without saying that depression sensors 3A arranged along both long sides of display section 4 are longer than depression sensors 3A arranged along both short sides. Disposing band-shaped depression sensor 3A in proximity to display section 4 allows effective utilization of space.

Furthermore, as shown in the flowchart in FIG. 11, electronic device 1 according to the present embodiment can determine a touch with a finger (feather touch)/touch (push) with a finger/touch with a glove or nail/hover. In addition, the display operation of display section 4 may be switched in accordance with these determination results. For example, the determination results may be displayed on display section 4 using icons or the like.

Electronic device 1 according to the present embodiment causes the ROM to store a program describing the processing indicated by the flowchart in FIG. 11, but it is also possible to store the program in a storage medium such as a magnetic disk, optical disk, magneto-optical disk or flash memory, distribute the program, and save the program in a server (not shown) on a network such as the Internet so as to be downloadable using a telecommunication channel.

Electronic device 1 according to the present embodiment is the present invention applied to a portable radio device called "smartphone." The present invention is, however, not limited to a portable radio device, but is also applicable to operation panels for household electrical appliances such as microwave oven and refrigerator, navigation operation panels for vehicles, or operation panels for HEMS (home energy management system) and BEMS (building energy management system) or the like.

In electronic device 1 according to the present embodiment, touch panel layer 2, display section 4, and depression sensor 3 are arranged in that order below glass 12, but a variety of shapes and arrangements may be considered for these components. Application examples thereof will be shown below.

Figure 14:
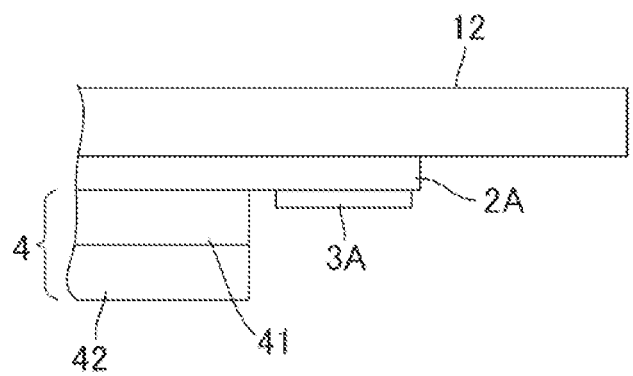
FIG. 14 illustrates an arrangement of the glass, the touch panel layer, the depression sensor, and the display section in application example 1 of the electronic device of FIG. 1.

(1) FIG. 14 illustrates an arrangement of glass, a touch panel layer, a depression sensor and a display section as application example 1. Application example 1 shown in FIG. 14 uses a glass touch panel layer (which is referred to as "touch panel layer 2A"), uses band-shaped depression sensor 3A shown in FIG. 12 or FIG. 13 as a depression sensor, disposes touch panel layer 2A on the undersurface side of protective glass 12, disposes depression sensor 3A on the periphery of the undersurface side of touch panel layer 2A, and disposes display section 4 on the undersurface side of touch panel layer 2A and at a position away from depression sensor 3A. Display section 4 includes LCD 41 and backlight 42, with the LCD 41 side disposed so as to face the touch panel layer 2A side.

Figure 15:
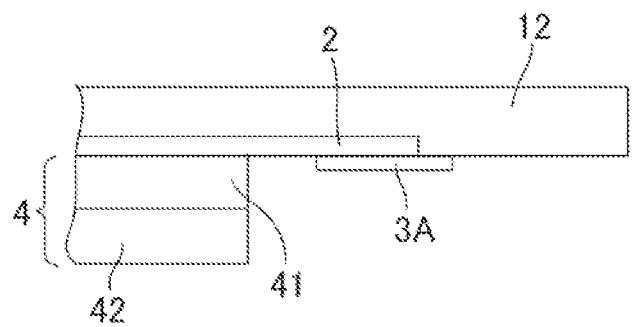
FIG. 15 illustrates an arrangement of the glass, the touch panel layer, the depression sensor, and the display section in application example 2 of the electronic device of FIG. 1.

(2) FIG. 15 illustrates an arrangement of glass, a touch panel layer, a depression sensor and a display section as application example 2. Application example 2 shown in FIG. 15 disposes touch panel layer 2 so as to be embedded on the undersurface side of protective glass 12. That is, protective glass 12 and touch panel layer 2 are integrated into one piece. Depression sensor 3A is disposed over the undersurface sides of glass 12 and touch panel layer 2, and display section 4 is disposed on the undersurface side of touch panel layer 2 and at a position away from depression sensor 3A. As in the case of aforementioned application example 1, display section 4 includes LCD 41 and backlight 42 and is disposed in such a way that LCD 41 aces the touch panel layer 2.

Figure 16:
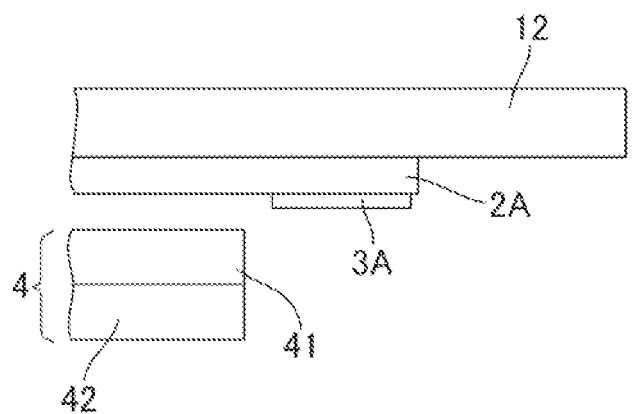
FIG. 16 illustrates an arrangement of the glass, the touch panel layer, the depression sensor, and the display section in application example 3 of the electronic device of FIG. 1.

(3) FIG. 16 illustrates an arrangement of glass, a touch panel layer, a depression sensor and a display section as application example 3. Application example 3 shown in FIG. 16 disposes glass touch panel layer 2A on the undersurface side of protective glass 12, disposes depression sensor 3A on the periphery of the undersurface side of touch panel layer 2A, and further disposes display section 4 below touch panel layer 2A and at a position away from touch panel layer 2A. As in the case of aforementioned application example 1, display section 1004 includes LCD 41 and backlight 42, and is disposed in such a way that the LCD 41 side faces touch panel layer 2A.

That is depression sensor 3A, touch panel layer 2A, and protective glass 12 are arranged at predetermined distances from display section 4.

Figure 17:
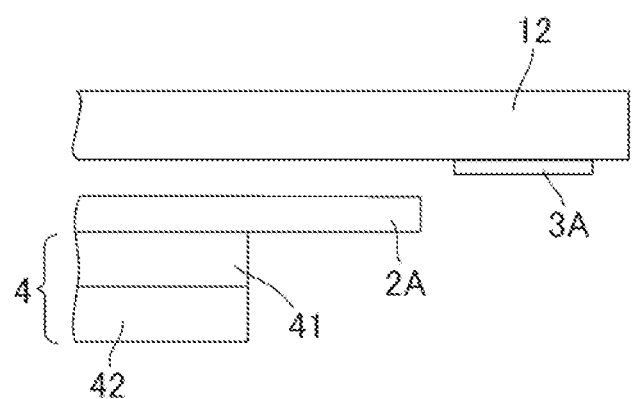
FIG. 17 illustrates an arrangement of the glass, the touch panel layer, the depression sensor, and the display section in application example 4 of the electronic device of FIG. 1.

(4) FIG. 17 illustrates an arrangement of glass, a touch panel layer, a depression sensor and a display section as application example 4. Application example 4 shown in FIG. 17 disposes depression sensor 3A on the periphery of the undersurface side of protective glass 12, disposes glass touch panel layer 2A below glass 12 and at a position away from glass 12 and further disposes display section 4 on the undersurface side of touch panel layer 2A. Display section 4 includes LCD 41 and backlight 42 and is disposed in such a way that the LCD 41 faces the touch panel layer 2A as in the case of aforementioned application example 1.

That is, depression sensor 3A and protective glass 12 are arranged at predetermined distances from touch panel layer 2A and display section 4.

In the arrangement shown in FIG. 16 or FIG. 17, display section 4 can be separated from protective glass 12 (e.g., 5 mm to 15 mm). The arrangement is effective, for example, when protective glass 12 has a certain amount of recessed and protruding parts or a certain degree of curvature, and when display section 4 is rigid and it is preferable to avoid glass 12 from contacting recessed and protruding portions or the like. Alternatively, it is also possible to dispose display section 4 inside one side (e.g., the door) of a refrigerator and dispose protective glass 12 having a certain degree of curvature on the side at a position corresponding to display section 4. Alternatively, it is also possible to dispose a large screen (e.g., 50-inch type) display section 4 inside a show window and use the show window glass (glass belonging to a building) as protective glass 12.

Figure 18:
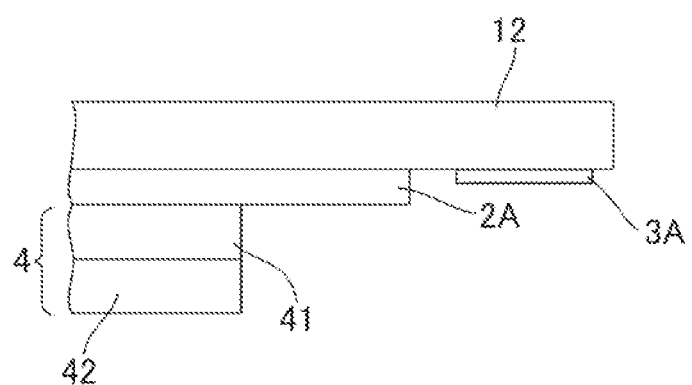
FIG. 18 illustrates an arrangement of the glass, the touch panel layer, the depression sensor, and the display section in application example 5 of the electronic device of FIG. 1.

(5) FIG. 18 illustrates an arrangement of glass, a touch panel layer, a depression sensor and a display section as application example 5. Application example 5 shown in FIG. 18 disposes touch panel layer 2A on an undersurface side of protective glass 12, disposes depression sensor 3A at a position away from touch panel layer 2A (on the periphery of glass 12) and further disposes display section 4 on the undersurface side of touch panel layer 2A. Display section 4 includes LCD 41 and backlight 42 and is disposed in such a way LCD 41 faces the touch panel layer 2A as in the case of aforementioned application example 1.

Figure 19:
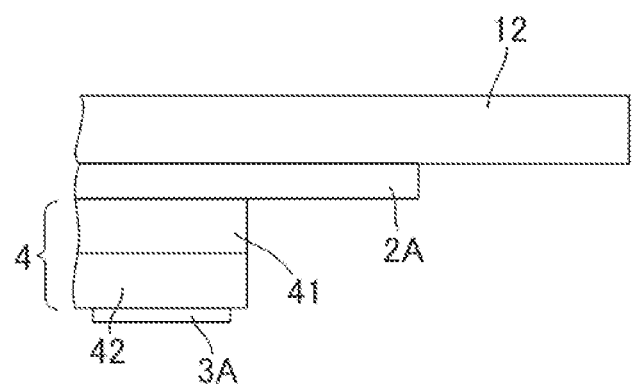
FIG. 19 illustrates an arrangement of the glass, the touch panel layer, the depression sensor, and the display section in application example 6 of the electronic device of FIG. 1.

(6) FIG. 19 illustrates an arrangement of glass, a touch panel layer, a depression sensor and a display section as application example 6. Application example 6 shown in FIG. 19 disposes touch panel layer 2A on the undersurface side of protective glass 12, disposes display section 4 on the undersurface side of touch panel layer 2A and further disposes depression sensor 3A on the periphery of the undersurface side of display section 4. Display section 4 includes LCD 41 and backlight and is disposed in such a way that LCD 41 faces touch panel layer 2A as in the case of aforementioned application example 1.

Furthermore, the position where depression sensor 3A is disposed is not limited to the undersurface side of display section 4, and depression sensor 3A may also be disposed on the top surface side (not shown) of the display section 4, on one side (not shown) of display section 4 or inside display section 4 (not shown).

Figure 20:
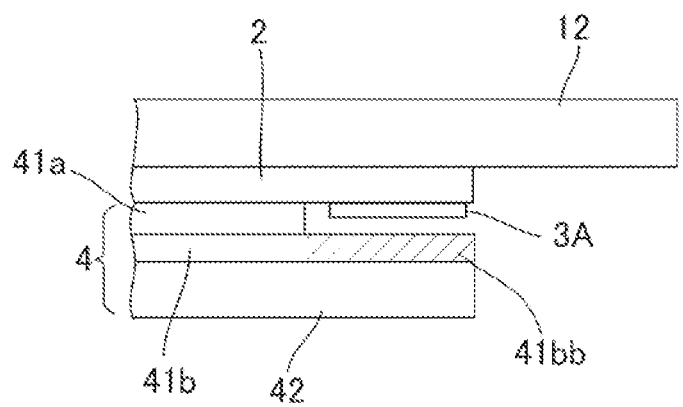
FIG. 20 illustrates an arrangement of the glass, the touch panel layer, the depression sensor, and the display section in application example 7 of the electronic device of FIG. 1.

(7) FIG. 20 illustrates an arrangement of glass, a touch panel layer, a depression sensor and a display section as application example 7. Application example 7 shown in FIG. 20 uses protective glass 12 as a first transparent member, adopts display section 4 including at least second transparent member 41a having a planar shape and third transparent member 41b disposed while being overlapped with second transparent member 41a with a liquid crystal interposed between second transparent member 41a and third transparent member 41b.

Furthermore, application example 7 disposes second transparent member 41a on the undersurface side of touch panel layer 2 at a position closer to the touch panel layer 2 side than third transparent member 41b, disposes part of third transparent member 41b at end 41bb of display section 4 so as to protrude outward from second transparent member 41a, and disposes depression sensor 3A on a part of touch panel layer 2 corresponding to protruding end 41bb of third transparent member 41b.

According to this arrangement, depression sensor 3A is disposed on the part corresponding to protruding end 41bb of third transparent member 41b, which eliminates the necessity for an additional space to dispose depression sensor 3A and allows efficient use of the space in electronic device 1.

Figure 21:
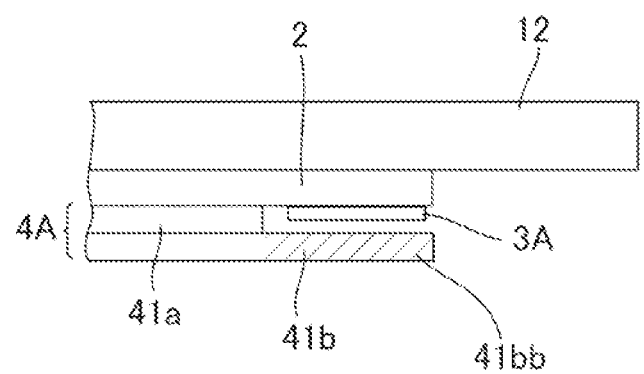
FIG. 21 illustrates an arrangement of the glass, the touch panel layer, the depression sensor, and the display section in application example 8 of the electronic device of FIG. 1.

(8) FIG. 21 illustrates an arrangement of glass, a touch panel layer, a depression sensor and a display section as application example 8. Application example 8 shown in FIG. 21 is a modification example of aforementioned application example 7, and while application example 7 uses liquid crystal display section 4, application example 8 uses organic EL display section 4A. Use of an organic EL display eliminates the necessity for a backlight.

According to this arrangement as in the case of application example 7, depression sensor 3A is disposed at a part corresponding to protruding end 41bb of third transparent member 41b, which eliminates the necessity for an additional space to dispose depression sensor 3A and allows efficient use of the space in electronic device 1.

In above-described Embodiment, the present invention is also applicable to a case where a program for signal processing is recorded or written into a machine readable recording medium such as a memory, disk, tape, CD or DVD to perform the operation of the present invention, and it is possible to achieve the operations and effects similar to those of the respective embodiments.

The present disclosure has the effect of being able to detect which part of the touch panel is pushed even in the case where the touch panel is touched with the glove or the nail, to say nothing of the case where the touch panel is touched with the finger, and can be applied to the electronic device that uses the capacitive touch panel such as the smartphone or the like.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2013-093646 filed on Apr. 26, 2013, the contents of which are incorporated herein by reference.

What is claimed is:
1. An electronic device comprising:
a housing;
a planar display disposed in the housing;
a planar transparent member disposed so as to overlap the display, and having a part exposed from the housing;
a touch panel layer disposed so as to overlap the display and detect two-dimensional coordinates of an indicator along a surface of the display and a vertical distance between the indicator and the surface of the display;
an acceleration detector that detects at least one of a first acceleration of the housing and/or the transparent member and a second acceleration of the housing and/or the transparent member, the second acceleration having a higher frequency than the first acceleration;
a depression detection section configured to detect a predetermined warp of the transparent member, and
a controller that determines, when the vertical distance is more than a first value and is equal to or smaller than a second value more than the first value:
(a) a touch operation is performed on the two-dimensional coordinates when at least one of the first acceleration, the second acceleration and a predetermined warp is detected, and

(b) a type of the indicator is a first type when at least one of the first acceleration and the predetermined warp is detected, and is a second type different from the first type when the second acceleration is detected.

2. The electronic device according to claim 1, wherein the controller further determines the touch operation is performed on the two-dimensional coordinates, by the indicator of a third type different from both of the first type and the second type, when the vertical distance is equal to or smaller than the first value and at least one of the first acceleration and the predetermined warp is detected.

3. The electronic device according to claim 1, wherein the display indicates the touch operation is performed, when the controller determines the touch operation is performed.

4. The electronic device according to claim 1, wherein the first value is 0.

5. The electronic device according to claim 1, wherein the transparent member and the touch panel layer are integrated into one piece.

6. The electronic device according to claim 1, wherein the display has a shape of a quadrangle, and the depression detection section is disposed along at least a side of the quadrangle.

7. The electronic device according to claim 6, wherein
the display has a shape of a rectangle, and
the depression detection section is disposed along at least one of short sides of the rectangle.

8. The electronic device according to claim 7, wherein
a home key is provided on a side of a predetermined short side of the rectangle, and
the depression detection section is disposed along the predetermined short side.

9. The electronic device according to claim 1, wherein at least a part of the depression detection section is disposed so as to overlap the touch panel layer.

10. The electronic device according to claim 1, wherein the depression detection section is disposed on the transparent member.

11. The electronic device according to claim 1, wherein the depression detection section is disposed on the touch panel layer.

12. The electronic device according to claim 1, wherein the depression detection section is disposed on the display.

13. The electronic device according to claim 1, wherein
the transparent member is a first transparent member,
the display includes a planar second transparent member and a third transparent member disposed so as to overlap the planar second transparent member,
the planar second transparent member is disposed at a position closer to the touch panel layer than the third transparent member,
a part of the third transparent member protrudes outward from the planar second transparent member at an end of the display, and
the depression detection section is disposed on a part of at least one of the transparent member and the touch panel layer corresponding to the protruding part of the third transparent member.

14. The electronic device according to claim 13, wherein the second transparent member and the third transparent member constitute a liquid crystal display section or an organic EL display section.

15. The electronic device according to claim 1, wherein the display and the transparent member are spaced apart from each other by a predetermined distance.

16. A coordinate detection method usable in an electronic device including a housing, a planar display disposed in the housing, a planar transparent member disposed so as to overlap the display, a touch panel layer disposed so as to overlap the display and detect two-dimensional coordinates of an indicator along a surface of the display and a vertical distance to the indicator from the surface of the display, an acceleration detector that detects at least one of a first acceleration of the housing and/or the transparent member and a second acceleration of the housing and/or the transparent member and a depression detection section configured to detect a predetermined warp of the transparent member, the coordinate detection method comprising:
determining a touch operation is performed, when the vertical distance is more than a first value and is equal to or smaller than a second value more than the first value and one of the first acceleration, the second acceleration and the predetermined warp is detected, the second acceleration having a higher frequency than the first acceleration; and
determining a type of indicator is a first type when at least one of the first acceleration and the predetermined warp is detected and is a second type different from the first type when the second acceleration is detected.

17. The electronic device according to claim 1, wherein the display further changes contents to be displayed, according to which of the first acceleration, the second acceleration and the predetermined warp is detected.

18. The electronic device according to claim 1, wherein the display further displays the type of the indicator, according to which of the first acceleration, the second acceleration and the predetermined warp is detected.

19. The electronic device of claim 1, wherein the type of the indicator of a first type is a glove and the type of indicator of the second type is a nail.

20. The method of claim 16, wherein the type of the indicator of a first type is a glove and the type of indicator of a second type is a nail.

* * * * *